(12) United States Patent
Stevens et al.

(10) Patent No.: US 9,026,594 B2
(45) Date of Patent: May 5, 2015

(54) METHOD AND SYSTEM FOR DETERMINING USER IMPACT ON THEIR CONTENT POOLS WITHIN AN ONLINE SOCIAL NETWORK

(71) Applicant: Apifia, Inc., Newton, MA (US)

(72) Inventors: Lyle Robert Stevens, Newton, MA (US); Sean Naegeli, Boston, MA (US)

(73) Assignee: Apifia, Inc., Newton, MA (US)

( * ) Notice: Subject to any disclaimer, the term of this patent is extended or adjusted under 35 U.S.C. 154(b) by 335 days.

(21) Appl. No.: 13/724,487

(22) Filed: Dec. 21, 2012

(65) Prior Publication Data

US 2013/0179511 A1 Jul. 11, 2013

Related U.S. Application Data

(60) Provisional application No. 61/583,437, filed on Jan. 5, 2012.

(51) Int. Cl.
*G06F 15/16* (2006.01)
*H04L 29/08* (2006.01)

(52) U.S. Cl.
CPC ............ *H04L 67/306* (2013.01); *H04L 67/02* (2013.01)

(58) Field of Classification Search
CPC .............. H04L 41/0213; H04L 29/08072; H04L 29/06; H04L 41/22; H04L 41/12
USPC ........................................ 709/204
See application file for complete search history.

(56) References Cited

U.S. PATENT DOCUMENTS

| | | | |
|---|---|---|---|
| 8,396,879 B1 * | 3/2013 | Cierniak et al. | 707/750 |
| 8,655,938 B1 * | 2/2014 | Smith et al. | 709/200 |
| 8,838,619 B1 * | 9/2014 | Cierniak et al. | 707/750 |
| 8,886,766 B2 * | 11/2014 | Dunn et al. | 709/219 |
| 2009/0048904 A1 * | 2/2009 | Newton et al. | 705/10 |
| 2012/0296991 A1 * | 11/2012 | Spivack et al. | 709/206 |
| 2013/0013680 A1 * | 1/2013 | Gupta et al. | 709/204 |
| 2013/0124653 A1 * | 5/2013 | Vick et al. | 709/206 |
| 2014/0019539 A1 * | 1/2014 | Novak et al. | 709/204 |
| 2014/0164398 A1 * | 6/2014 | Smith et al. | 707/748 |

OTHER PUBLICATIONS

Online printout of www.klout.com/how-it-works, accessed Dec. 20, 2012.

* cited by examiner

*Primary Examiner* — Philip Chea
*Assistant Examiner* — Wuji Chen
(74) *Attorney, Agent, or Firm* — Sean D. Detweiler, Esq.; Morse, Barnes-Brown & Pendleton, P.C.

(57) ABSTRACT

A method and apparatus for determining a user's impact in an online social network based on responses by other users to posts made by the user are provided. Responses by other users to one or more posts by the user are received. A response score is determined for each of the one or more responses. A post score is determined for each post by the user, based at least in part on the response score for that post. A cumulative score is determined based at least in part on the post score. An impact score is determined based at least in part on the cumulative score of the user and a total number of friends that the user has within the online social network. The impact score represents that user's impact or influence within his or her online social network, regardless of the particular size of that network.

16 Claims, 8 Drawing Sheets

METHOD AND SYSTEM FOR DETERMINING USER IMPACT ON THEIR CONTENT POOLS WITHIN AN ONLINE SOCIAL NETWORK

RELATED APPLICATION

This application claims priority to, and the benefit of U.S. Provisional Application No. 61/583,437, filed Jan. 5, 2012, for all subject matter common to both applications. The disclosure of said provisional application is hereby incorporated by reference in its entirety.

FIELD OF THE INVENTION

The present invention relates to social network systems. More specifically, the present invention provides systems and methods for determining users' impact on their respective content pools based on their posts, and responses by other users to those posts.

BACKGROUND

In online social networks, users communicate with one another in a number of different ways. Often, a user will post something that is generally accessible to any friend of that user within the online social network. However, it may be difficult to ascertain the impact that such posts have within the online social network community. Some known systems attempt to provide such data by scoring users' impact relative to the impact of other users within the online social network. The benefits of such known systems are understood in the art. For example, identifying influential users within social networks can be useful for marketing purposes. In some known systems, users who are identified as influential are provided promotional deals or are asked to provide a positive review of a product on a forum within the online social network environment. However, such systems often fail to distinguish between differences in each user's own network of friends. As a result, particular users are at an immediate disadvantage on the basis of factors that are unrelated to their true impact within their own particular group or sub-network of friends in the online social network.

SUMMARY

Accordingly, there is a need in the art for systems and methods that allow users to monitor the impact of their posts within their own personal communities. The present invention is directed to solutions to address this and other needs, as well as having other benefits that will be appreciated by one of skill in the art upon reading the present specification.

According to an example embodiment of the present invention, a computer implemented method is provided for determining a first user's impact on the first user's content pool in an online social network based on responses by other users to posts made by the first user. One or more responses to one or more posts by the first user can be received through at least one input device. Each of the one or more responses can be generated by one or more of the other users. A response score can be determined using one or more processors for each of the one or more responses. A post score can be determined using one or more processors for each post of the one or more posts by the first user. The post score can be based at least in part on the response score for one or more responses to that post. A cumulative score can be determined using one or more processors for the first user based at least in part on the post score for one or more posts by the first user. An impact score can be determined using one or more processors for the first user based at least in part on the cumulative score of the first user and a total number of friends that the first user has within the online social network. The impact score for the first user can be output through at least one output device.

According to further example embodiments of the present invention, in the step of determining a cumulative score for the first user, the post score of every post by the first user used in determining the cumulative score for the first user can be weighted based at least in part on an age of that post. The one or more responses can include one or more of a comment or a like. The one or more posts can include one or more of a status post, a picture post, a video post, a link post, or a wall post. The step of determining an impact score for the first user based at least in part on the cumulative score of the first user and a total number of friends that the first user has within the online social network further can include (a) determining a size of a content pool of the first user based on the total number of friends that the first user has within the online social network, and (b) determining the impact score for the first user based at least in part on the cumulative score of the first user and the size of the content pool of the first user.

According to further example embodiments of the present invention, the size of the content pool can include a number of the one or more posts by the first user used in determining the cumulative score for the first user and a number of responses to the one or more posts used in determining the cumulative score for the first user. The step of determining a response score for each of the one or more responses can include (a) determining a like score for each like of the one or more responses, and (b) determining a comment score for each comment of the one or more responses. The impact score can include a value on a relative scale enabling comparison with other users having an impact score on the relative scale.

According to another example embodiment of the present invention, a computer implemented method is provided for determining a degree of influence possessed by a user in an online social network. The degree of influence is indicated by a value on a relative scale in comparison with other users. A user like action score can be determined using a processor based on a quantity of like actions received by the user and a characterization score of each source of each like action. A user comment action score can be determined using a processor based on a quantity of comment actions received by the user and characterization score of each source of each comment action. A user content score can be determined using a processor based on the user like action score and the user comment action score. A post date factor can be applied to the user content score using a processor. The post date factor can be based on a relative age of the like actions and the comment actions. A ripple value can be determined using a processor based on the content score. A pond factor can be determined using a processor based on a total quantity of friends the user has in the online social network and a total quantity of posts by the first user. A splash value can be determined using a processor. The splash value can be on the relative scale for the degree of influence possessed by the user based on the ripple value and the pond factor.

According to yet another example embodiment of the present invention, a computer implemented method is provided for determining a first user's impact on the first user's content pool in an online social network based on responses by other users to posts made by the first user. One or more responses to one or more posts by the first user can be received through at least one input device. Each of the one or more responses can be by one or more of the other users. A cumulative score for the first user can be determined using one or more processors based at least in part on at least one of the one or more responses to at least one of the one or more posts by the first user and based at least in part on an age of each of the one or more posts by the first user. An impact score for the first user can be determined using one or more processors based at least in part on the cumulative score of the first user and a total number of friends that the first user has within the online social network. The impact score for the first user can be output through at least one output device. The impact score further can be based at least in part on a number of the one or more posts by the first user that is used in the step of determining the cumulative score for the first user.

BRIEF DESCRIPTION OF THE FIGURES

These and other characteristics of the present invention will be more fully understood with reference to the following detailed description in conjunction with the attached drawings, in which.

DETAILED DESCRIPTION

FIGS. 1 through 8, wherein like parts are designated by like reference numerals throughout, illustrate example embodiments of systems and methods for determining social network users' impact scores based on their posts and responses to those posts, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, in a manner still in keeping with the spirit and scope of the present invention.

Figure 1:
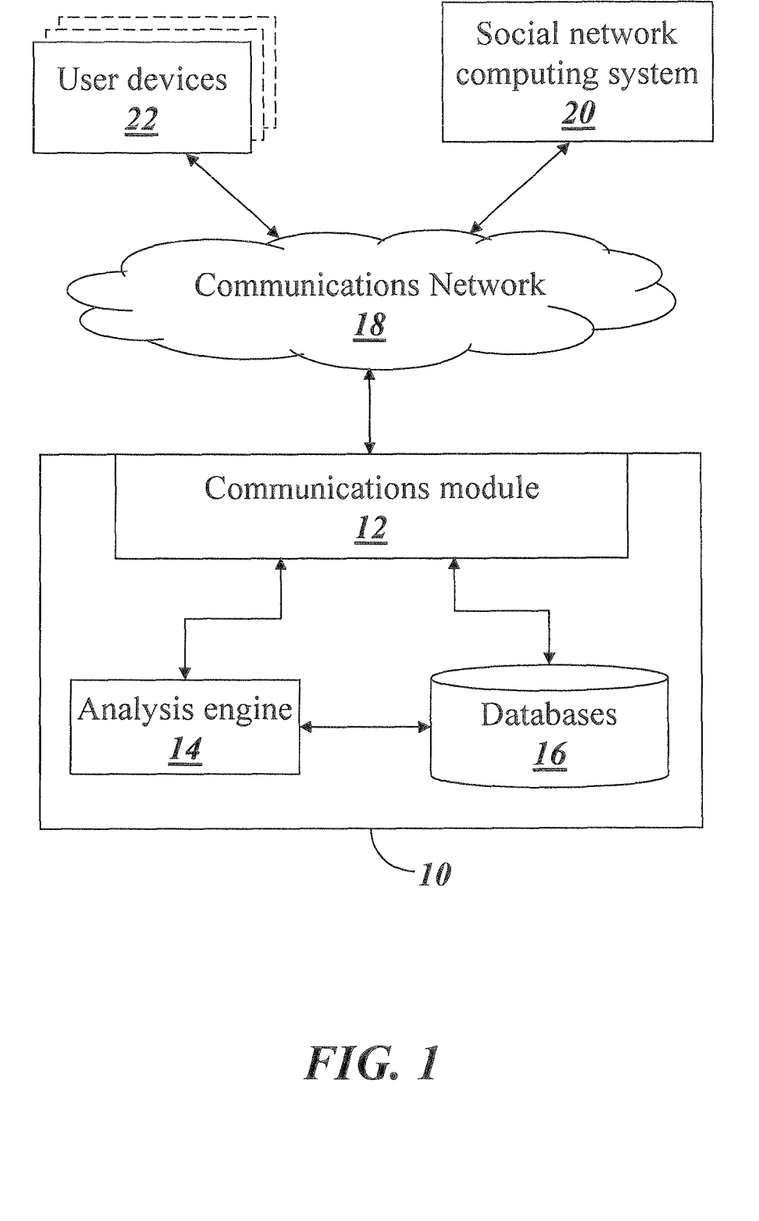
FIG. 1 is an illustrative diagram of an example embodiment of a system for performing one or more functions of embodiments of the present invention.

FIG. 1 depicts an example system 10 for performing various functions and methods of embodiments of the present invention described herein. The system 10 generally can include a communications module 12 for communicating with an online social network computing system 20 across a communications network 18. The system 10 further can include an analysis engine 14 for determining a variety of user scores, response scores (e.g., "like" scores and "comment" scores), and post scores, as will be described in detail herein. The system 10 can include one or more local databases 16 for storing various information, as will be described in greater detail herein. All of the various components of the system 10 can be logically connected and in communication with one another.

As described above, the system 10 can communicate with any number of different computing devices or systems by connecting to the communications network 18 (e.g., the Internet, or any other type of communications network), as would be appreciated by one of skill in the art. In addition to enabling communication between the system 10 and the online social network computing system 20, the communications network 28 also can enable communication between the online social network computing system 20 and a plurality of user devices 22, to allow users operating the user devices 22 to engage in an online social network hosted by the online social network computing system 20.

In particular, the online social network can enable a wide variety of social network functions by users of the online social network. For example, the online social network functions can include posting content, including video content ("video posts"), image content ("image posts"), user status content ("status posts"), wall content ("wall posts"), link content (e.g., "link posts"), and other content, as would be appreciated by one of skill in the art. Additionally, the online social network functions provided by the online social network computing system 20 can include allowing users with social network accounts to "friend" each other within the online social network, thereby forming a sub-network of friends to which each user belongs and participates. As yet further examples, the online social network computing system 20 can allow users to respond to each others' posts, e.g., subject to restrictions imposed by privacy settings that limit the accessibility of each user's content. For example, the responses can include a "like" (e.g., an indication that a user favors another user's post) and a "comment" (e.g., a written response by a user to another user's post).

Accordingly, each user of the online social network participates in (e.g., contributes to) a "content pool" that generally includes (a) a number of friends of the first user within the online social network, and (b) a number of posts by the user (e.g., only counting posts that satisfy certain time and/or quantity criteria). One of skill in the art will appreciate that in some embodiments, the content pool of a single may be implemented as a plurality of different content sub-pools, based on particular customizable groups or circles of friends created by user. For example, each user can have one or more content sub-pools that include all posts made by the user within a particular group or circle of friends, and all responses to those posts by friends within the particular group or circle.

Figure 2:
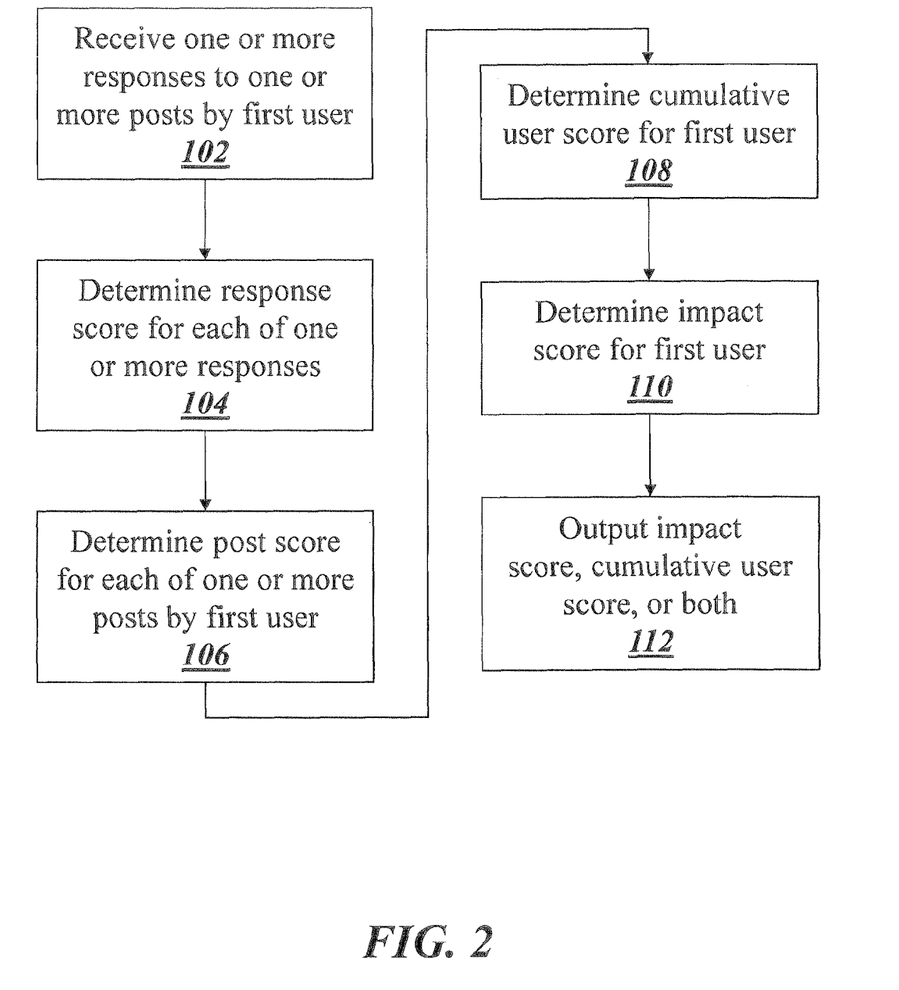
FIG. 2 is an example method for generating an impact score for a user, according to embodiments of the present invention.

According to illustrative embodiments of the present invention, the system 10 is configured to determine an impact score for a user of the online social network that indicates the user's impact on his or her content pool. For example, FIG. 2 depicts an example method for determining an impact score for a first user based on various data received from the online social network computing system 20, according to an illustrative embodiment of the present invention. The communications module 12 can receive, through at least one input device, one or more responses to one or more posts that were made by the first user (step 102). The analysis engine 14 can cause one or more processors to determine a response score for each of the one or more received responses (step 104). The response score can indicate a value of the response, e.g., based on factors like the influence of the user that posted the response, the type of response (e.g., a "like" versus "comment"), and the tendency or inclination of the user who made the response to respond to the user who made the post (e.g., a response bias by the responding user toward that particular user's posts). One of skill in the art will appreciate that the response score need not be calculated for each and every response that is received. For example, it may be desirable to automatically exclude certain responses (e.g., those identified as "spam") from step 104 of determining a response score. As yet another example, other responses that are automatically excluded from step 104 can include any responses by the first user him/herself to the post. For example, if a user responds frequently to his or her own posts, then it may be desirable to exclude such posts from the step 104 of determining a response score.

Once the response score is determined, the analysis engine 14 can cause one or more processors to determine a post score for each of the one or more posts by the first user for which a response was received in step 102 (step 106). For example, each post score for a post generally can be determined by aggregating all or some of the response scores for responses to that post. In further embodiments, each of the post scores can be determined by aggregating all or some of the response scores for responses to that post satisfying particular criteria, such as a time criterion (e.g., in order for the response score to be included in the aggregation, the response cannot be older than 90 days, etc.). Other possible criteria can include a quantity criterion (e.g., in order for the response score to be included in the aggregation, the response must be one of the 50 most recent responses that the first user has received to any post, etc.). Other criteria will be appreciated by one of skill in the art upon reading the present specification. For example, one of skill in the art will appreciate that certain responses can be automatically excluded (e.g., filtered) from the analysis in step 106 of determining the post score. As non-limiting and illustrative examples, response scores for responses identified as spam can be automatically excluded if desired, and response scores for responses identified as responses by the same user that made the post can be automatically excluded if desired. The present invention is in no way limited to the specific illustrative examples provided herein. One of skill in the art will appreciate yet other examples of responses that can be excluded from the analysis in step 106 of determining the post score.

Steps 104 and 106 can be repeated periodically, e.g., as new information is received from the online social network computing system 20. Furthermore, steps 104 and 106 can be performed for a plurality of different users, some or all of which are friends with one another in the online social network. Accordingly, various information (response scores, post scores, user information, friend information, post information, etc.) can be received and stored by the system 10 in the one or more databases 16, as will be described in greater detail herein.

Continuing with FIG. 2, the analysis engine 14 can cause one or more processors to determine a cumulative user score for the first user based on the post score for every post by the first user (step 108). Thus, the determination made in step 108 can be based on the post scores for the first user that are determined in step 106. As one illustrative and non-limiting example, the cumulative user score for the first user can be determined by aggregating all of the post scores the first user. In further embodiments of the present invention, the cumulative user score for the first user is determined by aggregating the post score for every post by the first user satisfying particular criteria. For example, step 108 can include determining the cumulative score for the first user based the post score of every post by the first user satisfying a time criterion (e.g., in order for the post score to be included in the aggregation, the post cannot be older than 60 days, etc.). Other possible criteria can include a quantity criterion (e.g., in order for the post score to be included in the aggregation, the post must be one of the 50 most recent posts that the first user had made, etc.). Other criteria will be appreciated by one of skill in the art upon reading the present specification. The present invention is in no way limited to the specific illustrative examples provided herein.

The analysis engine 14 further can cause one or more processors to determine an impact score for the first user based at least in part on the cumulative user score (step 110). For example, the impact score can represent an impact by the first user on the first user's content pool. Said differently, the impact score can represent a measure of how important the first user's contributions are to his or her content pool or how much influence the first user has within his or her content pool. Accordingly, step 110 of determining the impact score for the first user can include a step of determining (or retrieving from a database) a value representing the content pool of the first user. In some embodiments, the impact score for the first user is determined in step 108 by taking a ratio of the first user's cumulative user score to the value representing the first user's content pool. However, the present invention is not limited to the illustrative examples provided herein. One of skill in the art will appreciate a variety of modifications and alternatives upon reading the present specification.

The communications module 12 can cause the impact score for the first user, the cumulative user score for the first user, or both, to be output through at least one output device (step 112). In illustrative embodiments, step 112 includes sending the impact score and the cumulative user score for the first user to the online social network computing system 20 via the communications network 18, for display on one or more social network web pages hosted by the online social network computing system 20. For example, in step 112, the system 10 can cause the online social network computing system 20 to display the impact score and the cumulative user score for the first user to both the first user and/or one or more friends of the first user within the online social network.

Figure 3:
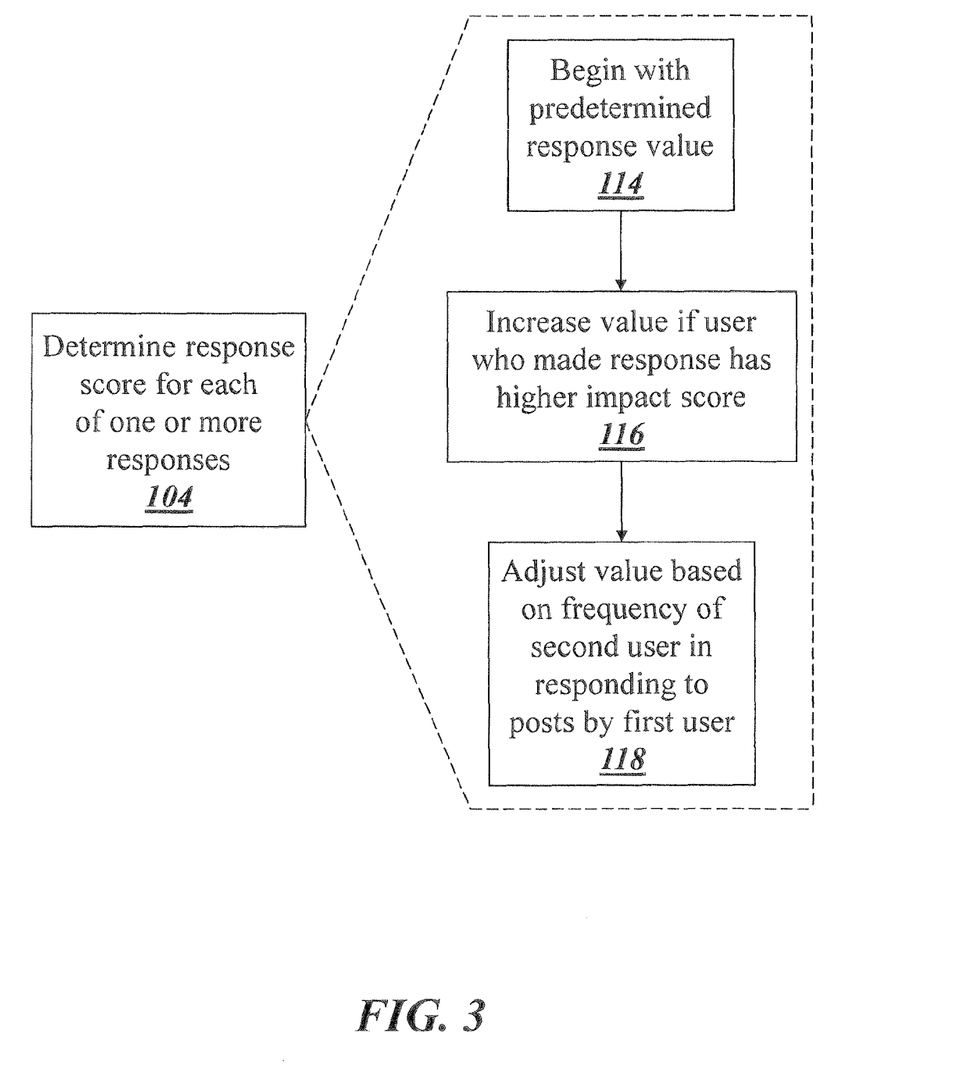
FIG. 3 is an example method for performing a step of determining a response score for each of one or more responses to posts made by a user, according to aspects of the present invention.

Turning to FIG. 3, an example method is depicted for performing step 104 of determining a response score for each of the one or more responses, according to a further illustrative embodiment of the present invention. For each of the one or more responses, the analysis engine 14 can begin with a predetermined response value (step 114). For example, the predetermined value can be different for different types of responses. In illustrative embodiments, the predetermined response value is greater for a comment than the predetermined response value for a "like," to reflect that a comment requires a greater effort than a "like." In some scenarios (e.g., if the first user has already been scored at least once in the past using the method of FIG. 2), the first user who received the response will already have an existing (e.g., previously determined) impact score. Similarly, the user who made the response also may have an existing (e.g., previously determined) impact score. In such situations, the predetermined response value for the response of step 114 can be increased if the user who made the response has a higher impact score than the first user (step 116). For example, step 116 can include the analysis engine 14 using one or more processors to query the one or more databases 16 to retrieve an existing impact score for both the first user who received the response and the user who made the response, and subsequently causing one or more processors to compare the two retrieved values. In some embodiments, the predetermined response value is increased in step 116 by an amount that is based on (e.g., proportional to) a difference between the existing impact score of the user who made the response and the existing impact score of the first user who received the response.

Additionally or alternatively, the analysis engine 14 can adjust the predetermined response value based on a frequency that the user who made the response (hereinafter referred to as the "second user") responds to posts by the first user (step 118). In illustrative embodiments, step 118 includes decreasing the predetermined response value by a predetermined amount (e.g., a percentage amount set by a weighting factor) if the frequency of the second user responding to posts by the first user satisfies a particular threshold value. Furthermore, in some embodiments, the frequency value that is used in making the adjustment of step 118 is limited to a particular time criterion or quantity criterion. For example, in step 118, the analysis engine 14 can query the one or more databases 16 for a number of responses the second user has made to posts by the first user within the past thirty days, etc. One of skill in the art will appreciate that the examples provided herein are illustrative and do not limit the present invention. Rather, many different time criteria and different types of criteria can be used in determining the frequency in step 118. For example, the analysis engine 14 alternatively can query the one or more databases 16 for a time period over which the second user has made the fifteen most recent responses to posts by the first user, and can thereby generate the requisite frequency in step 118.

Figure 4:
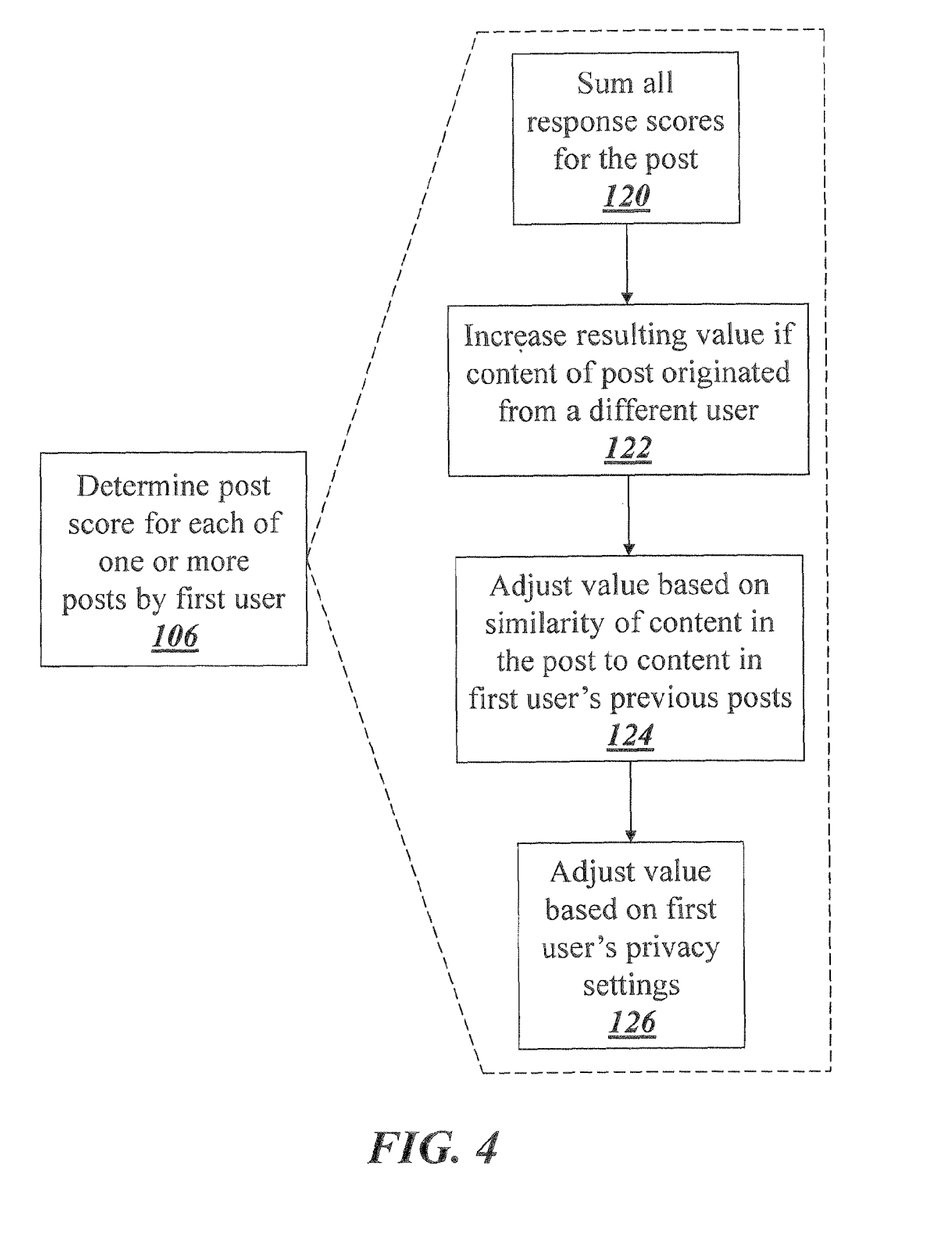
FIG. 4 is an example method for performing a step of determining a post score for each of one or more posts by a first user, according to aspects of the present invention.

Referring now to FIG. 4, an example method will be described for performing step 106 of determining the post score for each of the one or more posts by the first user, according to further illustrative embodiments of the present invention. For each one of the one or more posts by the first user, the analysis engine 14 can cause one or more processors to sum all response scores for that post (step 120). The analysis engine 14 can increase the resulting aggregate value if content of that post originated from a different user than the first user (step 122). In some situations, the user who originated the content of the post may have an existing (e.g., previously determined) impact score that is higher than an existing (e.g., previously determined) impact score for the first user. In such situations, and in some further embodiments of the present invention, the aggregate value resulting from step 120 is increased in step 122 by an amount that is based on (e.g., proportional to) a difference between the existing impact score of the user who originated the content and the existing impact score of the first user.

Furthermore, the resulting aggregate value for the post can be adjusted based on a similarity of the content in the post to content of previous posts by the first user (step 124). This step can be provided to reward and promote diversity of content in posts by users. For example, step 124 can include the analysis engine 14: (a) querying the one or more databases 16 for information about the content of the post by the first user for which the response scores were summed in step 120, (b) querying the one or more databases 16 for information about the content of previous posts by the first user (e.g., all previous posts satisfying a time constraint, a quantity constraint, etc.), (c) comparing the content of the previous posts by the first to the content of the post for which the aggregate value was determined, and (d) determining an amount (e.g., a percentage amount set by a weighting factor) to adjust the resulting aggregate value for the post by the first user. Additionally, the analysis engine 14 can cause one or more processors to adjust the resulting aggregate value for the post based on one or more privacy settings for the first user (step 126). For example, in some embodiments, the resulting aggregate values of posts for users having more restrictive privacy settings are increased. This step can be provided to compensate for the fact that users with more restrictive privacy settings effectively restrict the accessibility of their posts, thereby increasing the difficulty in gaining responses to their posts.

Figure 5:
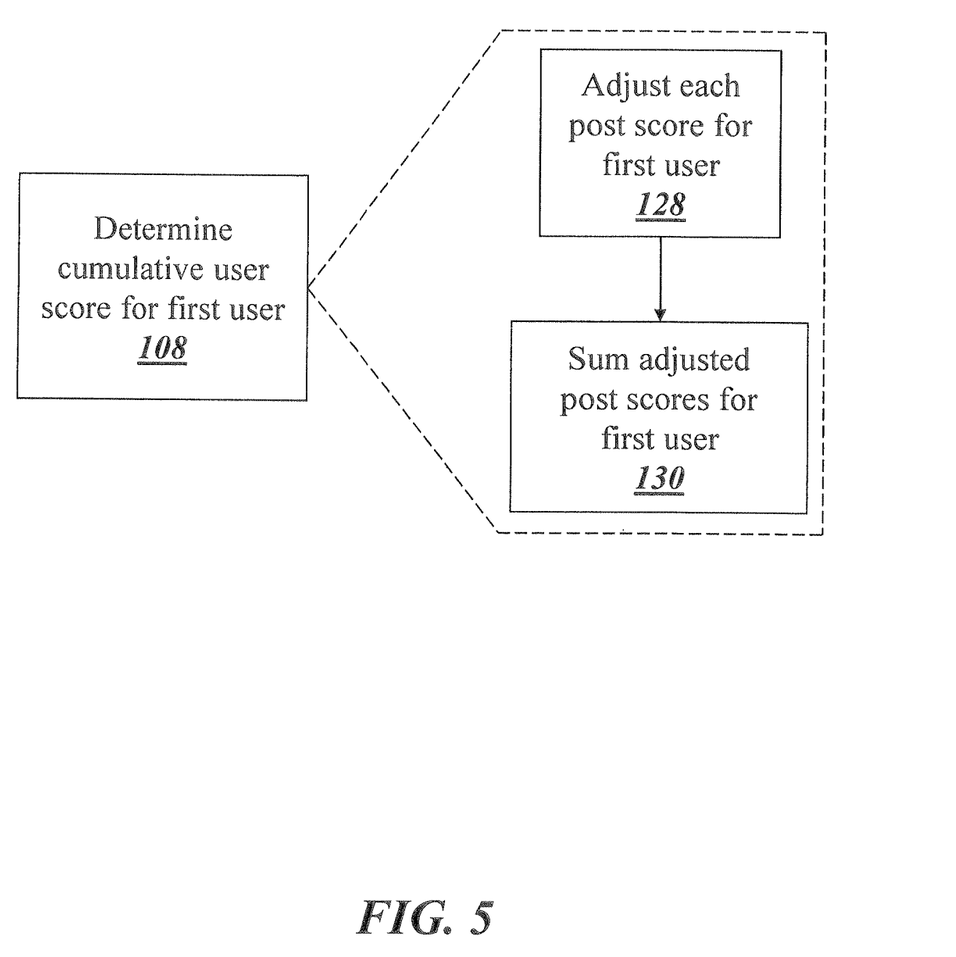
FIG. 5 is an example method for performing a step of determining a cumulative user score for a user, according to aspects of the present invention.

FIG. 5 depicts in detail an example method for performing step 108 of determining the cumulative user score for the first user, according to further illustrative embodiments of the present invention. In particular, the analysis engine 14 can cause one or more processors to adjust each post score for posts made by the first user (step 128), e.g., based on an age of each corresponding post. For example, in some embodiments, each post score is weighted by a weighting factor that is selected based on an age of the corresponding post. The weighting factors steadily decrease the value or contribution of each post score as the post corresponding to that post score become older. In particular, step 128 can include: (a) the analysis engine 14 querying the one or more databases 16 for a timestamp associated with each of the posts for which a post score was determined in step 106, (b) the analysis engine 14 determining an age of each post for which the post score was determined in step 106, and (c) multiply the post score for each post by a weighting factor associated with the determined age of the post. In some embodiments, only posts by the first user satisfying one or more criteria (e.g., time criteria, quantity criteria, and/or others) are adjusted in step 128 and summed in step 130. Accordingly, step 108 generally can include determining the cumulative user score for the first user based on a predetermined number of most recent posts by the first user occurring within a predetermined number of days. For example, in some illustrative embodiments, only the post scores for the most recent fifty posts by the first user occurring within the past ninety days are adjusted in step 128 and summed in step 130.

Subsequent to performing step 128 of adjusting each post score for the first user, the analysis engine 14 can cause one or more processors to take a sum of the adjusted post scores for the first user (step 130). In such further illustrative embodiments as depicted in FIG. 5, the aggregate value resulting from step 130 can serve as the cumulative user score, as determined for the first user.

Figure 6:
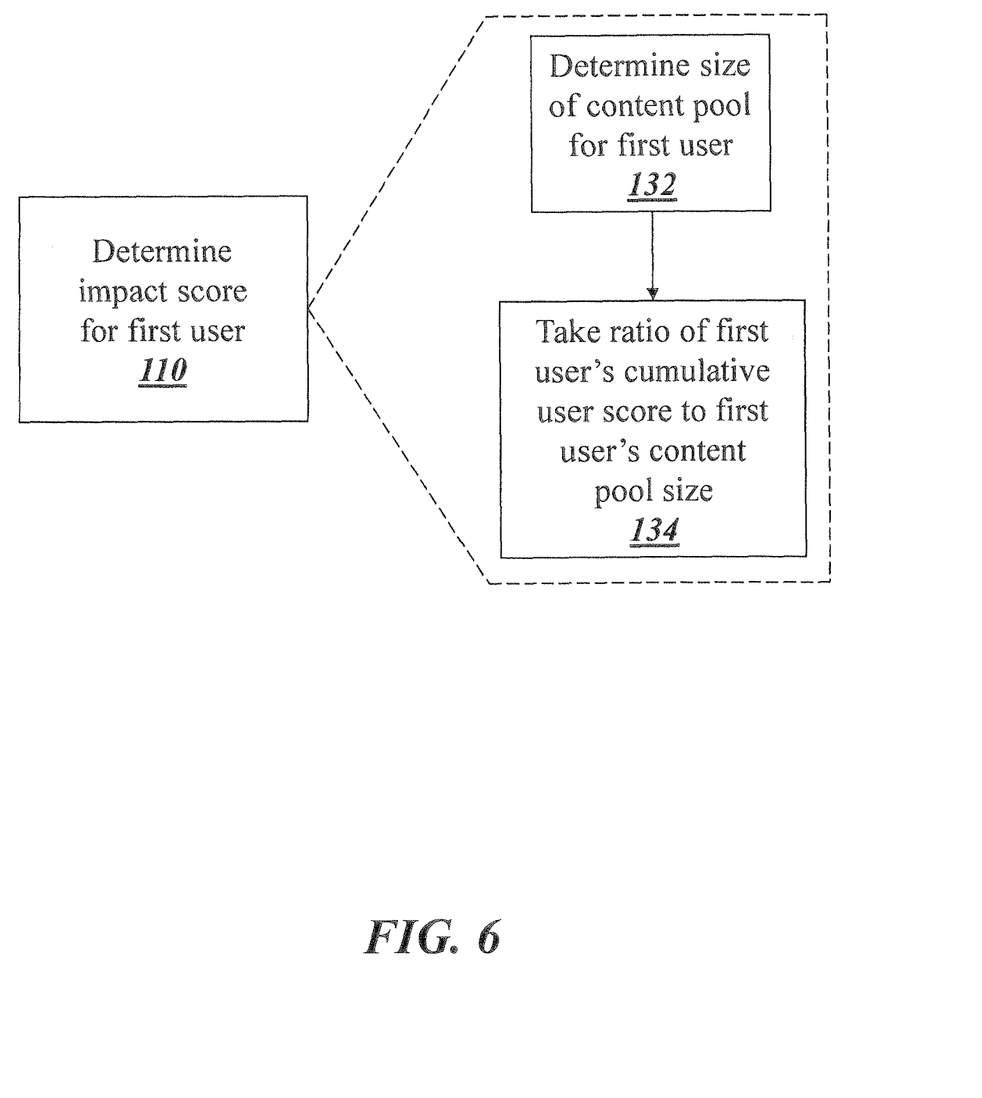
FIG. 6 is an example method for performing a step of determining an impact score for a user.

Turning now to FIG. 6, an example method will be described in detail for performing step 110 of determining the impact score for the first user, according to further illustrative embodiments of the present invention. The analysis engine 14 can determine a size of a content pool for the first user (step 132). The content pool can be based on all posts by the first user that are used in determining the cumulative user score for the first user in step 108, and the total number of friends in the online social network that the first user has. For example, in some embodiments, the size of the content pool for the first is determined by the analysis engine 14 causing one or more processors to: (a) determine a first value reflecting the total number of posts by the first user being used to determine the cumulative user score for the first user, (b) determine a second value reflecting the total number of friends that the first user has within the online social network, and (c) multiply the first value by the second value. Furthermore, in some embodiments, the content pool can be determined by a further step of (d) multiplying the product of the first value and the second value by a third value reflecting an average number of friends users have on the online social network.

Subsequent to determining the size of the content pool for the first user in step 132, the analysis engine 14 can cause one or more processors to generate the first user's impact score by taking a ratio of the first user's impact score determined in step 108 to the size of the content pool for the first user determined in step 132 (step 134). The ratio generated in step 134 can serve as the impact score of step 110. As an illustrative example, if the first user is determined to have a cumulative user score of "10" in step 108 and a content pool size of "100" in step 132, then the first user can be determined to have an impact score of "0.1" in step 134.

In general, for embodiments of the present invention utilizing the example method of FIG. 6, step 112 optionally can further include outputting the size of the content pool, e.g., to the online social network computing system 20 for display on web pages hosted thereon. It should be appreciated that when outputting the impact scores, cumulative user scores, and/or content pool sizes, that any such scores or sizes generally can be expressed as numeric values (e.g., rounded integer values, decimal values, ratios, percentages, rankings, etc.), textual phrases or expressions (e.g., "Content pool size: large," "content pool size: medium," "content pool size: small"), pictures, colors, or any other suitable visual representation capable of representing a user's impact score, cumulative user score, or content pool size. One of skill in the art will appreciate that embodiments of the present invention are not limited specifically to numeric values. Rather, the scores and/or content pool sizes can be output in step 112 in any format suitable for presentation to the users.

It should be appreciated that the methods described herein can be performed separately for different types post (e.g., distinguished on the basis of type of content), different types of responses (e.g., comments, likes, etc.), and the like, according to further illustrative embodiments of the present invention. For example, in some embodiments, step 106 is performed separately for different types of posts. For example, step 104 can include determining a "like" score for each of the one or more responses that consists of a "like" and determining a comment score for each of the one or more responses that consists of a comment. Accordingly, in such embodiments, step 106 can include: (a) determining an aggregate "like" score comprising a sum of all "like" scores for each post, (b) determining an aggregate comment score comprising a sum of all comments for each post, and (c) summing the aggregate "like" score and aggregate comment score for each post to determine the post score for each of the one or more posts by the first user.

Furthermore, the methods described herein can be performed separately for posts having different types or categories of content, according to further illustrative embodiments of the present invention. For example, step 106 can include determining a post score for each video post by the first user, determining a post score for each image post by the first user, determining a post score for each status post by the first user, determining a post score for each wall post by the first user, determining a post score for each link post by the first user, and/or various combinations thereof. Accordingly, step 108 can include the steps of: (a) determining an aggregate video content score for the first user comprising the sum of all post scores for video posts by the first user, (b) determining an aggregate image content score for the first user comprising the sum of all post scores for image posts by the first user, (c) determining an aggregate status content score for the first user comprising the sum of all post scores for status posts by the first user, (d) determining an aggregate wall content score for the first user comprising the sum of all post scores for wall posts by the first user, (e) determining an aggregate link content score for the first user comprising the sum of all post scores for link posts by the first user, and (f) summing the aggregate video content score, the aggregate image content score, the aggregate status content score, and the aggregate wall content score, thereby arriving at the cumulating user score for the first user. The above process can be completed for various combinations of some or all of the various categories of content listed, and for content not specifically identified herein but that one of skill in the art would consider for the described process.

One of skill in the art will appreciate upon reading the present specification that various information can be stored in the one or more databases 16 to enable convenient and quick retrieval of information that is used in the methods described herein with reference to FIGS. 2 through 6. Accordingly, in some embodiments, such information is continuously, periodically, etc. received by the communications module 12 through at least one input device from the online social network computing system 20 to better facilitate the functionality described herein.

Figure 7:
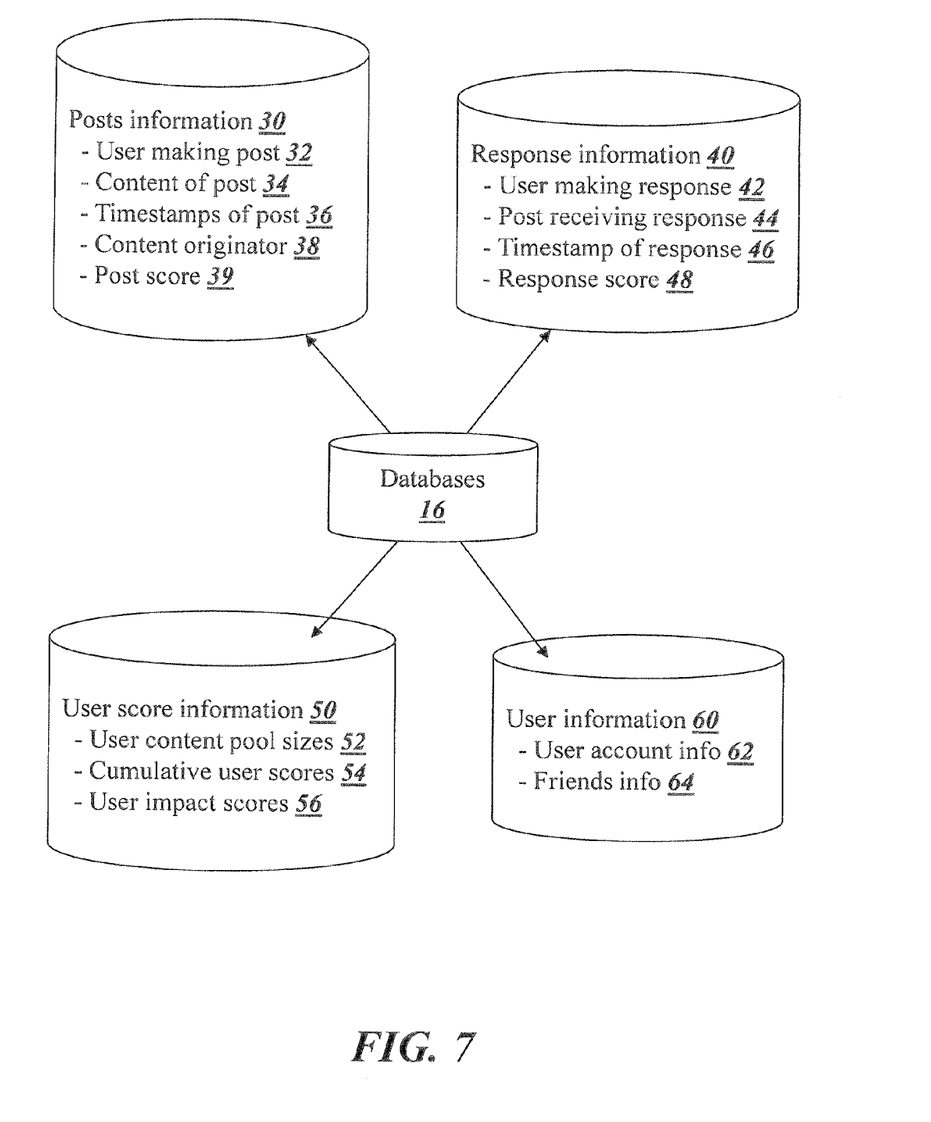
FIG. 7 is an illustrative diagram of a variety of information that can be stored in one or more databases for facilitating the example methods of FIGS. 2 through 6, according to aspects of the present invention.

For example, FIG. 7 depicts various illustrative sets of information to be stored in the one or more databases 16, according to further illustrative embodiments of the present invention. Specifically, the one or more databases can include post information 30. In addition to including the actual posts themselves, the post information 30 can include identifications of which users have made each post 32, identifications of the content of each post 34, a timestamp indicating when each post was made 36, an identification of a user that originated the content of each post 38, and post scores for each post 39 (e.g., as determined in step 106 and stored subsequently thereafter). The one or more databases 16 also can include response information 40, which (in addition to including the actual responses themselves) can include an identification of the user that made each response 42, an identification of the post that received each response 44 (e.g., and also the user who received each response), a timestamp indicating when each response was made 46, and a response score for each response 48. The one or more databases 16 further can include user score information 50, which can include values determined by the system 10 in performing the example method of FIG. 2. For example, the user score information 50 can include user content pool sizes 52 (e.g., as determined in step 132), cumulative user scores 54 (e.g., as determined in step 108), and user impact scores 56 (e.g., as determined in step 110). Furthermore, the one or more databases 16 can include user information 60. The user information 60 can include user account information 62 associated with each user's social network account (e.g., account name, etc.), as well as information about the online social network friends of each user 64 (e.g., account names of each user's social network friends, a number of social network friends that each user has, etc.). One of skill in the art will appreciate many different ways to expand or reduce the information to be included in the one or more databases 16 upon reading the present specification. The present invention is not limited to the specific illustrative examples provided herein and described with reference to FIG. 7.

In certain example embodiments, the cumulative user score, content pool size, and impact score can be better understood and conceptualized by way of analogy to a pond. In the analogy, each user being scored lives within a pond that generally represents that user's social network community. Said differently, the content pool for a user can be thought of as a pond that signifies a representative amount of content the user creates, weighted by the size of the user's social network community (e.g., the number of friends the user has in the online social network). Continuing with the analogy, the cumulative user score can be thought of as a size of a ripple made by each user in his or her pond. Thus, the ripple of a user signifies a raw size of response generated by the user. The impact score can be thought of as a size of a splash that each user makes in his or her pond. Whether a user's splash is large or small is evaluated relative to the size of the user's pond.

Accordingly, in example embodiments of the present invention, users are each provided with an impact score (e.g., a splash score) that is ultimately weighted according to their respective number of friends in the online social network (e.g., the size of their social network community, or "pond"). Beneficially, this allows a hypothetical user that is a "big fish in a small pond" but who is nonetheless influential in his or her community to receive an impact score (e.g., a splash score) that is equivalent to the impact score of a big fish in a big pond (e.g., an equally influential user in a larger community). Said differently, a user's impact score is based on that user's impact or influence within his or her social network community, regardless of the particular size of his or her social network community.

In general, any suitable computing device can implement the system 10 and the methods described herein. For example, the computing device can include one or more server devices, e.g., logically coupled and in communication with each other. Accordingly, the components (e.g., the modules and engines) of FIG. 1 generally can be implemented as executable instructions contained in one or more non-transitory computer readable storage devices included in the computing device, one or more input devices, one or more output devices, etc., as would be appreciated by one of skill in the art.

Figure 8:
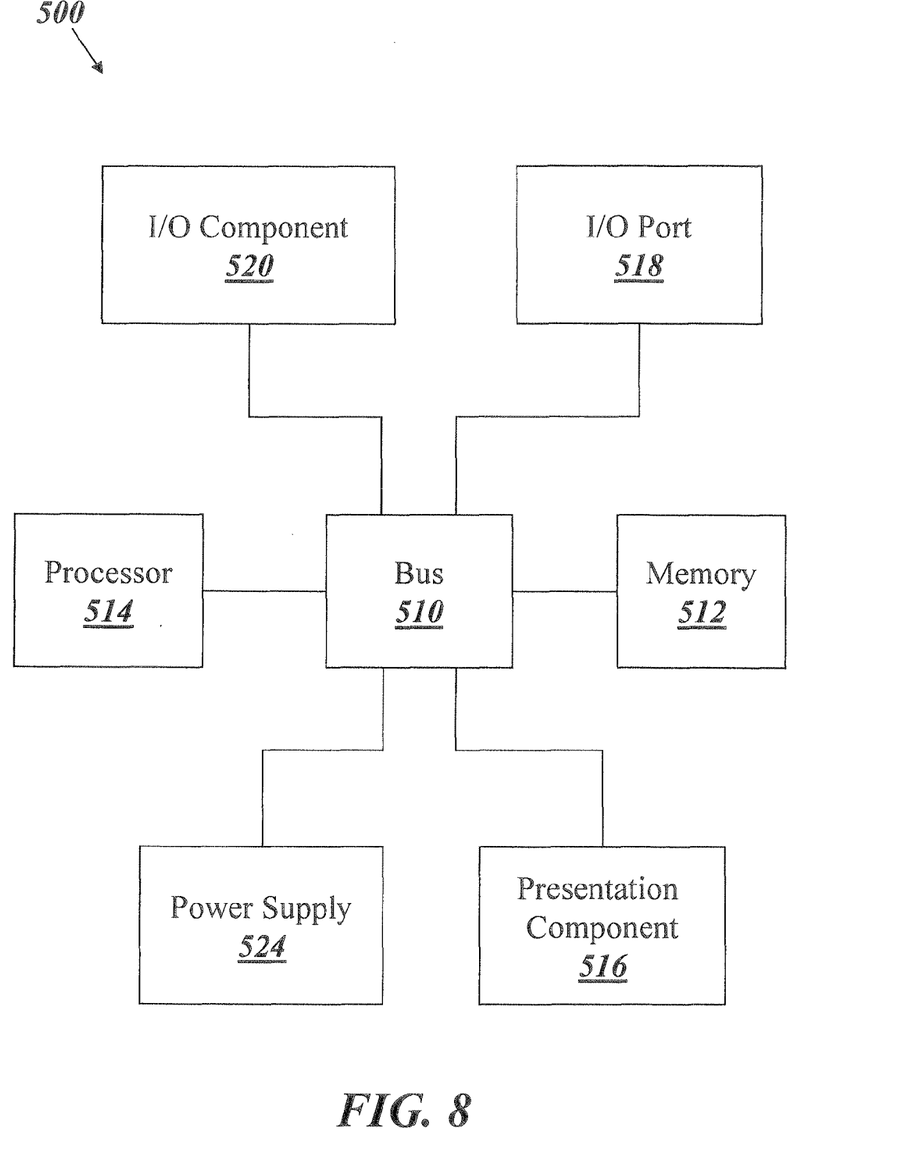
FIG. 8 is an example computing device for implementing the system of FIG. 1, according to aspects of the present invention.

FIG. 8 illustrates an example of a computing device 500 for implementing illustrative methods and systems of the present invention. The computing device 500 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 520, etc. Presentation component(s) 516 present data indications to a user or other device. Exemplary presentation components include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

One of skill in the art will appreciate a wide variety of ways to modify and alter the system 10 of FIG. 1, as well as the various components with which it interacts. For example, the one or more databases 16 can be implemented according to any number of suitable database structures. Furthermore, some or all of the information contained in the one or more databases 16 alternatively can be stored in one or more remote databases (e.g., cloud databases, virtual databases, and any other remote database). Additionally, although the components of FIG. 1 are depicted as discrete blocks and elements, in fact the system 10 may be implemented in such a way that multiple of the depicted modules, engines, or other components are implemented with just a single module, engine, or component. Similarly, in some embodiments it may be desirable to implement the system 10 using multiple iterations of the depicted modules, engines, and/or other components, as would be appreciated by one of skill in the art. Furthermore, while some modules and components are depicted as included within the system 10, it should be understood that, in fact, any of the depicted modules alternatively can be excluded from the system 10 and included in a different system. One of skill in the art will appreciate a variety of other ways to expand, reduce, or otherwise modify the system 10 upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method for determining a first user's impact on the first user's content pool in an online social network based on responses by other users to posts made by the first user, the method comprising:
   receiving, through at least one input device, one or more responses to one or more posts by the first user, each of the one or more responses being by one or more of the other users;
   determining, using one or more processors, a response score for each of the one or more responses;
   determining, using one or more processors, a post score for each post of the one or more posts by the first user, the post score based at least in part on the response score for one or more responses to that post;
   determining, using one or more processors, a cumulative score for the first user based at least in part on the post score for one or more posts by the first user;
   determining, using one or more processors, an impact score for the first user based at least in part on the cumulative score of the first user and a total number of friends that the first user has within the online social network; and
   outputting, through at least one output device, the impact score for the first user.

2. The computer implemented method of claim 1, wherein in the step of determining a cumulative score for the first user, the post score of every post by the first user used in determining the cumulative score for the first user is weighted based at least in part on an age of that post.

3. The computer implemented method of claim 1, wherein the one or more responses comprise one or more of a comment or a like indication.

4. The computer implemented method of claim 1, wherein the one or more posts comprise one or more of a status post, a picture post, a video post, a link post, or a wall post.

5. The computer implemented method of claim 1, wherein the step of determining an impact score for the first user based at least in part on the cumulative score of the first user and a total number of friends that the first user has within the online social network further comprises:
   determining a size of a content pool of the first user based on the total number of friends that the first user has within the online social network; and
   determining the impact score for the first user based at least in part on the cumulative score of the first user and the size of the content pool of the first user.

6. The computer implemented method of claim 5, further wherein the size of the content pool comprises a number of the one or more posts by the first user used in determining the cumulative score for the first user and a number of responses to the one or more posts used in determining the cumulative score for the first user.

7. The computer implemented method of claim 1, wherein the step of determining a response score for each of the one or more responses comprises:
   determining a like score for each like of the one or more responses; and
   determining a comment score for each comment of the one or more responses.

8. The computer implemented method of claim 1, wherein the impact score comprises a value on a relative scale enabling comparison with other users having an impact score on the relative scale.

9. A computer implemented method of determining a degree of influence possessed by a user in an online social network, the degree of influence indicated by a value on a relative scale in comparison with other users, the method comprising:
   determining, using a processor, a user like action score based on a quantity of like actions received by the user and a characterization score of each source of each like action;
   determining, using a processor, a user comment action score based on a quantity of comment actions received by the user and characterization score of each source of each comment action;
   determining, using a processor, a user content score based on the user like action score and the user comment action score;
   applying a post date factor to the user content score using a processor, wherein the post date factor is based on a relative age of the like actions and the comment actions;
   determining, using a processor, a ripple value based on the content score;
   determining, using a processor, a pond factor based on a total quantity of friends the first user has in the online social network and a total quantity of posts by the first user;
   determining, using a processor, a splash value on the relative scale for the degree of influence possessed by the user based on the ripple value and the pond factor.

10. A computer implemented method for determining a first user's impact on the first user's content pool in an online social network based on responses by other users to posts made by the first user, the method comprising:
    receiving, through at least one input device, one or more responses to one or more posts by the first user, each of the one or more responses being by one or more of the other users;
    determining, using one or more processors, a cumulative score for the first user based at least in part on at least one of the one or more responses to at least one of the one or more posts by the first user and based at least in part on an age of each of the one or more posts by the first user;
    determining, using one or more processors, an impact score for the first user based at least in part on the cumulative score of the first user and a total number of friends that the first user has within the online social network; and
    outputting, through at least one output device, the impact score for the first user;
    wherein the impact score further is based at least in part on a number of the one or more posts by the first user that is used in the step of determining the cumulative score for the first user.

11. The computer implemented method of claim 10, wherein the one or more responses comprise one or more of a comment or a like indication.

12. The computer implemented method of claim 10, wherein the one or more posts comprise one or more of a status post, a picture post, a video post, a link post, or a wall post.

13. The computer implemented method of claim 10, wherein the step of determining an impact score for the first user based at least in part on the cumulative score of the first user and a total number of friends that the first user has within the online social network further comprises:
    determining a size of a content pool of the first user based on the total number of friends that the first user has within the online social network; and determining the impact score for the first user based at least in part on the cumulative score of the first user and the size of the content pool of the first user.

14. The computer implemented method of claim 13, further wherein the size of the content pool comprises a number of the one or more posts by the first user used in determining the cumulative score for the first user and a number of responses to the one or more posts used in determining the cumulative score for the first user.

15. The computer implemented method of claim 10, wherein the step of determining a response score for each of the one or more responses comprises:
   determining a like score for each like of the one or more responses; and
   determining a comment score for each comment of the one or more responses.

16. The computer implemented method of claim 10, wherein the impact score comprises a value on a relative scale enabling comparison with other users having an impact score on the relative scale.

* * * * *